Figure 1:
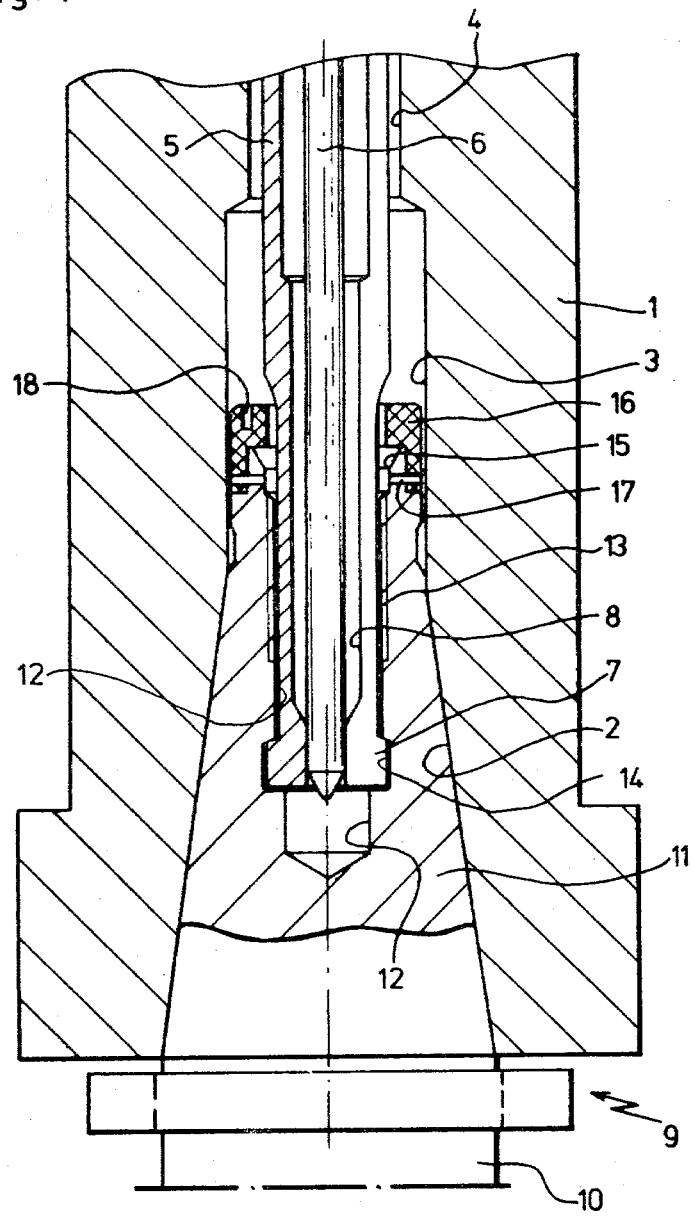

United States Patent [19]

Schmid et al.

[11] 4,226,562
[45] Oct. 7, 1980

[54] TOOLHOLDER

[75] Inventors: Herbert Schmid, Renningen; Ernst Schmid, Ditzingen, both of Fed. Rep. of Germany

[73] Assignee: Schmid-Kosta KG, Renningen, Fed. Rep. of Germany

[21] Appl. No.: 941,356

[22] Filed: Sep. 11, 1978

[30] Foreign Application Priority Data

Sep. 16, 1977 [DE] Fed. Rep. of Germany ....... 2741810
Dec. 13, 1977 [DE] Fed. Rep. of Germany ....... 2755393

[51] Int. Cl.³ .................................................. B23C 5/26
[52] U.S. Cl. .................................. 409/233; 279/1 TS; 279/1 A; 279/103; 408/239 A
[58] Field of Search ............ 90/11 A, 11 D; 279/1 A, 279/1 S, 1 TS, 9, 103; 408/226, 239, 239 A; 409/231, 232, 233, 239

[56] References Cited

U.S. PATENT DOCUMENTS

| 3,544,121 | 12/1970 | Mizoguchi | 279/51 |
| 3,858,892 | 1/1975 | Rutschke et al. | 279/1 TS |
| 4,068,559 | 1/1978 | Schmid, Jr. et al. | 90/11 D |

FOREIGN PATENT DOCUMENTS 1416696 12/1975 United Kingdom ................ 279/1 TS Primary Examiner—Z. R. Bilinsky
Attorney, Agent, or Firm—William D. Hall; Geoffrey R. Myers

[57] ABSTRACT

A toolholder has a shank with a tapered body which is adapted to fit into a complementary socket in an end face of a machine tool spindle. A blind bore in the body is engageable by holding means for holding the shank in the socket. A first axial section of this bore is threaded for engagement with a threaded member of one kind of holding means such as a pulling rod or a set bolt coacting with pulling means. A second axial section of the bore is enlarged to form an annular groove for engagement by an expansible head of a pulling member of an alternative kind of holding means. An encoder ring is removably fixed at the toolholder. Each time the tool is exchanged the encoder ring is replaced by an encoder ring corresponding to the new tool.

8 Claims, 5 Drawing Figures

TOOLHOLDER

The invention relates to a toolholder or a tool having a conical shaft to be introduced into and fastened in a standardized conical bore of a machine-tool spindle, comprising a centrally arranged bore starting at the end opposite the tool, with a threaded section of standardized dimensions incorporated therein for receiving a draw-in rod of a set bolt coacting with draw-in means of the machine.

Toolholders of this type have been known before. They serve to receive milling cutters of the most different design and are drawn into and clamped in the conical bore of the machine spindle by means of draw-in means which take the form of either a threaded rod which is screwed into the standardized threaded section, or else a draw-in chucking member coacting with the head of a set bolt which is in turn screwed into the standardized threaded section. It is true that the conical bore in the spindle is standardized, but the different machine-tool manufacturers use different chucking means. The adaptation to the chucking element of the machine-tool can be ensured by exchanging the set bolt. The set bolts are provided with outer annular grooves and screwed into the standardized threaded section M 24×2.

There have also been suggested toolholders with a central through-bore in which an additional threaded section was provided for inserting a checkable threaded pin permitting the axial adjustment of the tool. Such special toolholders had their conical shaft shortened and screwed into the face end of the bore a sleeve-shaped adapter provided with an inner annular groove which coacted with a chucking member that was equipped with projections arranged for radially outward movement. The use of non-standardized toolholders is generally restricted to certain special applications as the advantages provided by the standardization are lost as a result thereof. On the other hand, the arrangement of these toolholders using an inner annular groove to achieve the necessary chucking effect can be realized in a manner very convenient for the user. In this arrangement, the adapter was necessary to account for the dimensional conditions and circumstances.

Now, it is the object of the present invention to provide a toolholder which while complying with the accepted standards permits nevertheless the advantageous internal chucking application, although, as an alternative, the external chucking application is also possible, using the known set bolts.

According to the present application, this problem is solved by a standardized toolholder of the type described above in which an inner annular groove for receiving a chucking member which in its clamping position is pressed radially outwardly, is provided in addition to the standardized threaded section in axially offset arrangement in relation thereto.

For, in the meantime it has been found that it is possible to design the dimensions of the chucking member so as to permit the latter to coact with an internal annular groove which in turn has its dimensions adapted to the central bore and/or the standardized threaded section of the toolholder. Such a toolholder offers the advantage that it can be used, without any change whatever, for an internal chucking application and that, on the other hand, it is likewise suited for the external chucking applications after insertion of a set bolt of the known type. Thus, such a toolholder is suited for all-round use so that the user is absolutely free to use the toolholder at will and to employ one and the same toolholder for machines of different manufacture. This offers a number of advantages in both economic and operational respects.

The internal annular groove may be provided before or behind the threaded section. In preferred embodiments of the invention, the internal annular groove is provided at the side of the standardized threaded section opposite the tool. The advantage of this arrangement lies in the fact that the chucking member does not have to pass a greater distance within the toolholder. In addition, it excludes the risk of damages to the standardized threaded section that may be caused when the chucking member has to be passed through it. In a further embodiment of the invention, the internal annular groove is preferably provided at small axial distance from the machine and of the conical shaft which preferably has an encoder ring fastened to its face. The encoder ring serves during the automatic tool change to identify the individual tools which are stored in a tool store at or near the machine.

The toolholder described above has arranged the internal annular groove at a distance from the one end of the standardized threaded bore and the encoder ring at a distance from the other end thereof, the encoder ring forming the face end of the toolholder shaft. The encoder pins are provided in parallel arrangement relative to each other and in axial arrangement relative to the toolholder and inserted in pocket bores in the face of the encoder ring so that this face can be scanned to determine the presence or absence of the encoder pins. The encoder ring is provided with an axially projecting sleeve which can be positioned on a corresponding sleeve-shaped axial projection at the face of the toolholder shaft and fixed in this position by the insertion of radial pins. This method of fixing the encoder ring is reliable and determines the angular position of the encoder ring in relation to a longitudinal reference plane. This method proves satisfactory in cases where the encoder ring is directly fastened to the shaft of a tool because the coding in relation to the tool may remain unchanged. However, in cases where the encoder ring is fastened to a toolholder which requires occasional changes of the tool, the coding of the encoder ring must also be corrected by removing and/or inserting encoder pins as necessary. However, this is extremely difficult because the encoder pins must be reliably held in the encoder ring so that their removal is not easy and because, in addition, the encoder pins do practically not project from the face of the encoder ring. Therefore, the only possibility left is to remove the whole encoding ring and to exchange it against another one corresponding to the new tool to be inserted into the toolholder. However, an exchange of the encoder ring is relatively time-consuming because the radial pins must be removed by force and exchanged against new pins, and in certain cases even new bores must be made for the pins.

In one preferred embodiment of a toolholder with encoder arrangement, the encoder ring is, therefore, removably fixed against rotation at the toolholder, using a snap lock.

This astonishingly simple solution avoids the difficulties previously encountered when exchanging the tool in the known toolholder. Each time a tool is to be removed and exchanged against another tool, one simply has to detach the encoder ring and to replace it by a new encoder ring corresponding to the new tool, so as to provide for the correct match between tool and encoder ring.

The snap lock may be of different design. For example, the encoder ring may have two or more pins projecting from its face, with end portions of larger cross-sections, arranged for insertion into bores provided in the toolholder, the bores having provided therein spring washers engaging over the said portions of larger cross-section to act as snap lock. The spring washers may for example also take the form of O rings such as commonly used for sealing purposes, seated in corresponding grooves in the said bores. In a particularly preferred embodiment of the invention, however, the snap lock comprises a sleeve portion made from plastic material comprising an inwardly curved end for engaging over a peripheral rib the cross-section of which shows a flatly curved configuration. Thus, the encoder ring is fastened to the toolholder in a manner similar to that used for fastening conventional plastic caps which are generally used for closing crown cork bottles which have been opened but not yet emptied. This method of fastening is sufficiently reliable and needs no tools at all. If necessary, a suitably shaped tool may be used for effecting the removal.

In a preferred further improvement of the invention, the face of the sleeve portion is designed to coact with a shoulder of the toolholder. This arrangement offers the advantage to ensure a defined axial position of the encoder ring.

The rigidity against rotation of the encoder ring is necessary to warrant the correct automatic reading of the given coding as the code determined depends on the angular position of the encoder ring relative to the toolholder. Provided the snap lock ensures sufficient rigidity against rotation, it will suffice to provide the encoder ring and the toolholder with a mark and to position the encoder ring in accordance with such marks. In a preferred embodiment of the invention, however, there is a pin projecting axially from one point of the shoulder of the toolholder which coacts with a recess in the sleeve section ending at the face of the encoder ring. The correct angular position of the encoder ring relative to the toolholder is thus positively secured, which fact excludes on the one hand the risk of an incorrect, assembly of the encoder ring as regards its angular position and ensures, on the other hand, that the correct angular position of the encoder ring in relation to the toolholder is reliably maintained, independently of all stresses that may be encountered.

In preferred embodiments of the invention peripheral bevels are provided at at least two opposite points of the sleeve section for permitting the application of a fork-shaped spanner for removing the encoder ring, acting on the one hand against the shoulder faces of the encoder ring formed by the said bevels and on the other hand against the adjacent shoulder of the toolholder. With the aid of such a fork-shaped spanner, the thickness of which should correspond approximately to the width of the peripheral bevels ending in the said face, the encoder ring can be removed easily and without any particular effort. To this effect, the two prongs of the fork-shaped tool are preferably slightly tapered towards their free ends to facilitate the application of the tool.

Figure 3:
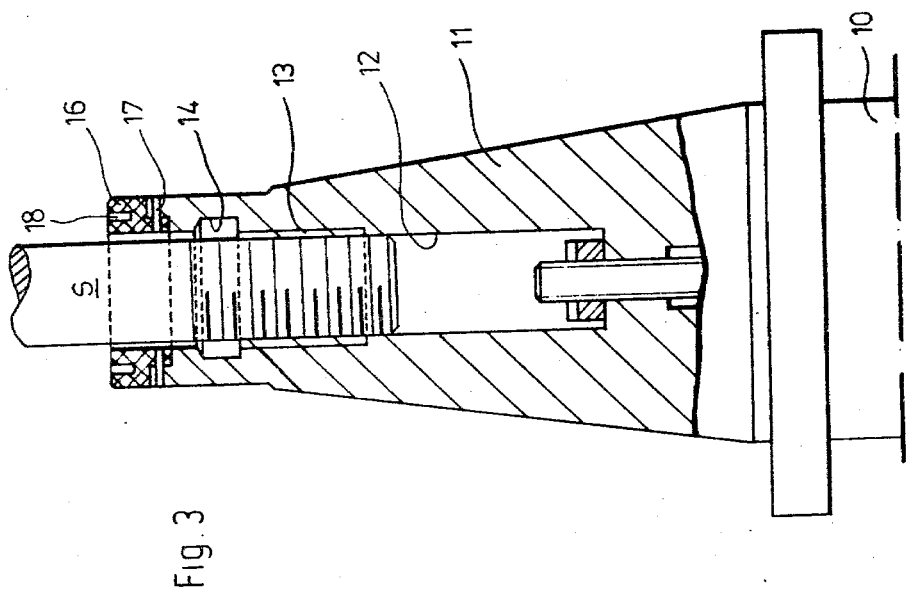
Figure 2:
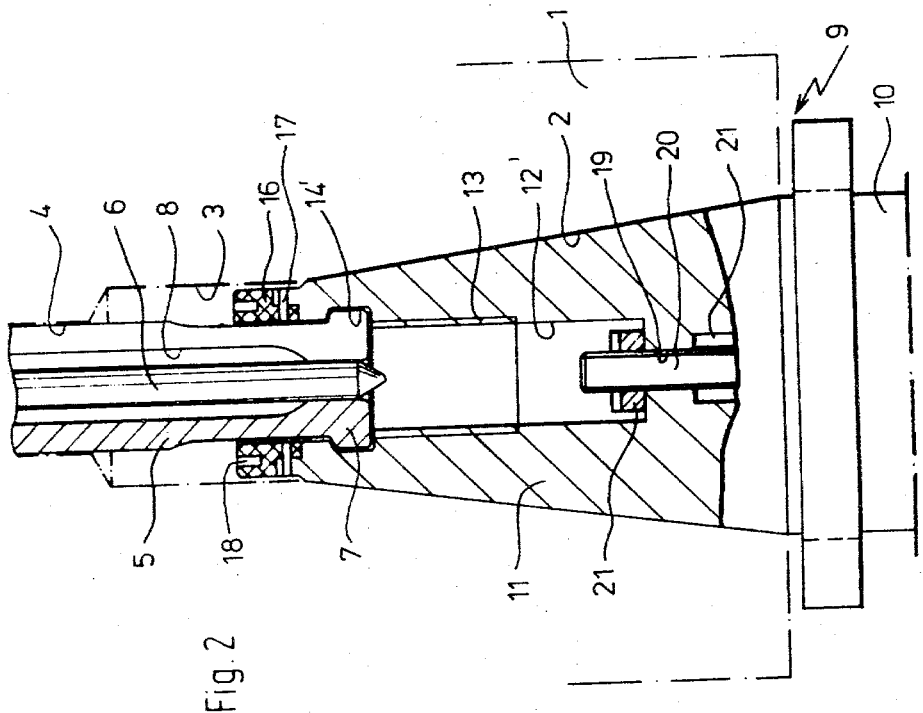
Figure 4:
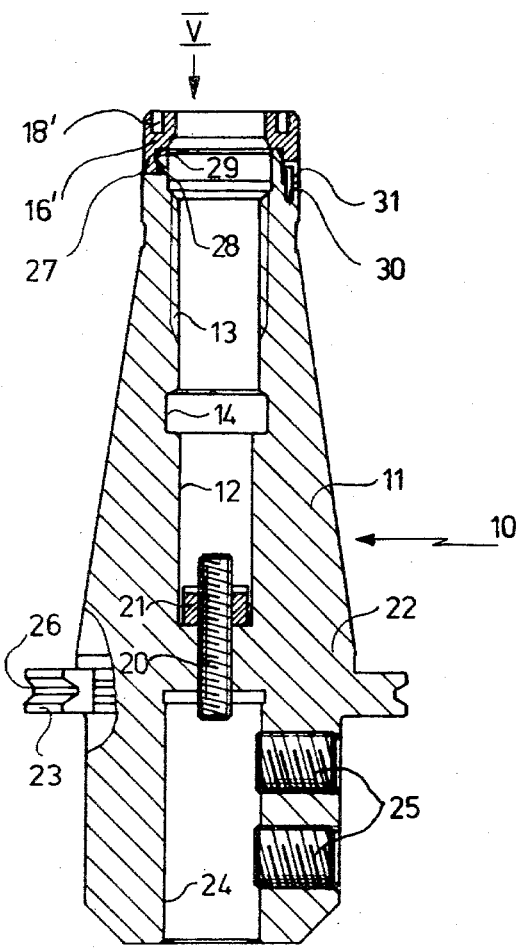

Further details and improvements of the present invention will be apparent from the following description of certain examples shown in the drawing, read in conjunction with the claims. The drawings, in which any parts not absolutely necessary for the understanding of the invention have been omitted, show in a somewhat simplified manner:

FIG. 1 a longitudinal cross-section through a machine-tool spindle with the toolholder mounted therein, the toolholder being shown partly in elevation;

FIG. 2 a view similar to FIG. 1 of another toolholder;

FIG. 3 a view likewise similar to FIG. 1 of a further toolholder;

FIG. 4 a cross-section through a toolholder with encoder ring and

Figure 5:
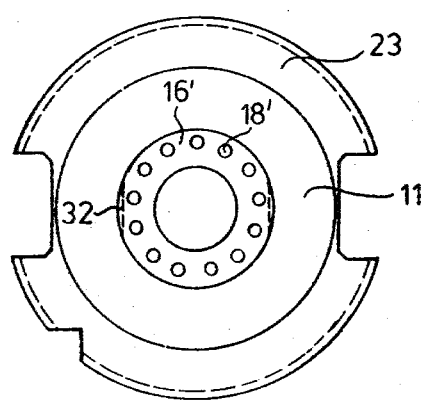

FIG. 5 a plan view of the arrangement of FIG. 4, viewed in the direction indicated by arrow V.

In a spindle 1 of a milling machine not shown in detail, there is provided, starting from one face of the said spindle, a conical bore 2 continued by a cylindrical bore 3 which in turn is continued by a longitudinal bore 4 of reduced diameter. The other end—not shown—of the spindle 1 of the machine-tool carries chucking means comprising a draw member 5 taking the form of a longitudinally slotted sleeve, with a tension rod 6 mounted therein for longitudinal movement. In the area of the cylindrical bore 3, the draw member 5 tapers towards its end, said tapering portion being followed by radially outwardly projecting portions 7 performing the function of pressure pads. The projections 7 can be radially adjusted by means of the tension rod 6 due to the fact that an internal bore 8 of a diameter which is considerably larger than the diameter of the tension rod 6, is reduced in the area of the projections 7 to a diameter corresponding approx. to the diameter of the tension rod. When the tension rod 6 is retracted relative to the draw member 5 i.e. away from the toolholder, the projections 7 are allowed to return resiliently to their inner position. Thus, both the tension rod 6 and the draw member 5 can be axially displaced, on the other hand, relative to each other and, on the other hand, relative to the spindle 5. The chucking means and the draw member with the tension rod have been known already from German Laid-Open Patent Application No. 25 45 713.

A toolholder 9 with a toolholding fixture 10—not shown in detail—is provided with a conical shaft 11 comprising a central pocket bore 12 ending at the face opposite the toolholding fixture 10. The said pocket bore 12 comprises a portion of a standardized thread 13, into which a set bolt S can be screwed when the arrangement is to be used as an outer chuck (as shown in FIG. 3) and not as an internal chuck as shown in FIGS. 1-2. At a small distance from the end of the standard-thread section 13 facing the toolholding fixture 10, an internal annular groove 14 is provided. In the position shown in the drawing, the projections 7, which perform the function of pressure pads, are pressed into engagement with the said internal annular groove 14 by the tension rod 6. Towards the open end of the pocket bore 12, the standard-thread section 13 opens into a bore 15. The face of the toolholder 9 opposite the toolholding fixture carries an encoder ring 16 which is fastened by means of radial transverse pins 17 and which has axially inserted in its face encoder pins 18 which perform the function of coding marks.

For the purpose of exchanging a tool, the tension rod 6 is first retracted, and when the tension means 5 is thereafter moved away from the toolholder 9, suitably inclined flanks of the internal annular groove 14 cause the projections 7 to move radially inwardly until they get out of engagement so that the toolholder 9 can be withdrawn from the spindle 1. Now, the tool is exchanged and the new tool inserted, and then the draw member 5 is advanced towards the toolholder until the projections 7 reach the area of the internal annular groove 14, whereupon the tension rod 6 is pushed into the position shown in the drawing for locking the draw member in this position. Finally, a traction force is exerted upon the draw member 5 to secure the toolholder 9 in the spindle 1.

In the embodiment shown in FIG. 2, the toolholder has no cylindrical section projecting into the cylindrical bore 3, and only the encoding ring 16 extends into the cylindrical bore of the spindle 1. Moreover, the internal annular groove 14' is provided at the end of the standard-thread section 13 opposite the toolholding fixture 10. In addition, the bore 12' is followed by a threaded bore 19 of reduced diameter. A threaded pin 20 is screwed into the said bore and fixed axially by means of a check nut 21. The threaded pin 19 permits the axial adjustment of the tool—not shown—relative to the toolholder 9. The advantage of this embodiment is seen in the fact that this arrangement excludes any risk that the standard-thread section 13 may be damaged by the projections 7 which perform the function of pressure pads and that the length of the in-movement to be performed by the toolholder relative to the draw member 5 and the tension rod 6 is considerably shortened. Moreover, the length of the draw member 5 and the tension rod 6 can be correspondingly reduced.

In the embodiment shown in FIG. 3, in which the draw member 5 and the tension rod 6 have been omitted for simplicity's sake, the standard-thread section 13 and the internal annular groove 14' are even more remote from the toolholding fixture 10 and provided in an cylindrical portion of the shaft 11 which, similarly to the arrangement shown in FIG. 1, follows the conical shaft section. This permits a further reduction of the length of the draw member and the tension rod.

The toolholder 10 comprises an essentially cylindrical body 22 and a coaxially arranged conical shaft 11. One face of the body 22 is provided with a bore 24 for receiving the shaft of a tool—not shown in detail—which can be secured in position by means of clamping screws 25 provided in radially extending threaded bores in the body 22. For the purpose of adjusting the axial position of the tool relative to the toolholder 1, the threaded pin 20 is screwed into the central threaded bore 19 and fixed by means of a check-nut 21, while one face of the threaded bore projects into the bore 24. The check-nut 21 and the threaded pin 20 are accessible through the bore 12 which opens to the face of the shaft 11 opposite the tool. Between the shaft 11 and the body 22, there is provided a collar 23 comprising a peripheral trapezoidal groove 26.

Toolholders of this type are often stored in a tool-changing magazine associated with the machine-tool, from where they are withdrawn and inserted into the machine as required by the operational programme to be performed by the machine. For control purposes, the toolholder is provided with a mechanically readable identification mark which is permanently associated with the tool mounted in the toolholder 10. The face of the shaft 11 opposite the tool carries an encoder ring 16', the free face of which is provided with bores provided in parallel and spaced arrangement along a pitch circle, with encoder pins 18' seated therein. The encoder ring 16' is made from a plastic material, and the encoder pins 18' consist preferably of a ferromagnetic material. The image of the encoder pins 18 and/or 18' present or missing in the bores correspond to a binary number associated with a specific tool. Such codings can be mechanically read by corresponding scanners.

To ensure the safe attachement of the encoder ring 16' to the toolholder 10 on the one hand and the easy exchange-ability of the encoder ring 16' on the occasion of a tool change at the toolholder on the other hand, the encoder ring 16' is provided with a sleeve section 27 forming an integral part thereof. The end of the said sleeve section shows a slightly inwardly curved configuration. The end of the shaft 11 is faced to form a shoulder 28. The tubular end of the shaft 11 is provided with a peripheral rib 29 of slightly convex shape whose maximum diameter is somewhat larger than the minimum diameter of the inward curve of the sleeve section end 27. The sleeve section 27 is made from a plastic material exhibiting a certain elasticity and can be pushed over the tubular end of the shaft 11. During this operation, the inwardly curved end of the sleeve section expands a little to overcome the rib 29, whereupon it engages the recess defined by the rib 29 on the one hand and the shoulder 28 on the other hand, so as to secure the encoder ring 16' reliably upon the toolholder 10, with the face of the sleeve section 27 resting against the shoulder 28.

At one point of its periphery, the shoulder 28 is provided with an axial bore in which a pin 30 is inserted. In the face of the sleeve section 27, an axially extending recess 31 is provided whose width in circumferential direction is essentially identical to the diameter of the pin 30. When the encoder ring 16' is placed in position, the recess 31 must be brought into alingment with the pin 30, whereupon the encoder ring 16' must be pressed home.

To facilitate the removal of the encoder ring 16' from the toolholder 10, the latter is provided with two peripheral bevels 32 at two opposite points of its periphery in the area of the inwardly curved end of the sleeve section 27. These two bevels permit the application of a fork-shaped spanner of a thickness which is essentially identical to the axial extension of the bevel which ends at the face of the sleeve section 27. Slight tilting of the applied fork-shaped tool makes the latter bear against the shoulder 28 on the one hand and against the shoulder formed by the bevel 32 on the other hand. At the same time, the encoder ring is lifted in axial direction until the inwardly curved end of the sleeve section has overcome the largest diameter of the rib 29, whereupon the ring can be easily retracted or will even come off all alone.

It shall be understood that the present invention is not limited to the embodiments shown by way of example and that deviations therefrom are possible without exceeding the scope of the present invention. In particular, it shall be understood that the individual features of this invention may be employed either separately or in different combinations. Moreover, it shall also be understood that the use of an encoder ring of the type described is not restricted to toolholders with threaded stop pins 20 and/or internal annular groove 14 or standard thread 13. In contrast, an encoder ring of this type can be generally mounted at the shaft ends of all tools and toolholders which do not use the face of the shaft end for fastening purposes.

What we claim is:

1. In a spindle-to-toolholder attaching and detaching mechanism for machine tools having a spindle comprised of an externally threaded draw bar for threaded attachment within a bore of a toolholder or a spindle provided with a chucking means having a radially expandable and contractable draw member provided along a peripheral edge thereof with a radially outwardly extending projection and a tension rod means for radially expanding said draw member, said tension rod being axially movable with respect to said draw member and said spindle, a toolholder selectively attachable to and detachable from either of said machine tool spindles, said tool holder comprising a centrally extending bore means for receiving either said externally threaded draw bar or said chucking means, said bore means being provided with an outwardly, radially extending annular groove so located and of a dimension sufficient to engage the radially outwardly extending projection of said draw member when said chucking means is inserted in said bore and said tension rod means is axially actuated to radially expand said draw member thereby securing said toolholder in said spindle, said groove being further located and of a dimension sufficient to allow said projection to be disengaged therefrom upon axial deactivation of said tension rod means to radially contract said draw member and wherein said bore means further includes a threaded section of a compatible dimension with said externally threaded draw bar such that said externally threaded draw bar is threadably attachable therein, said mechanism allowing said toolholder to be readily attachable to and detachable from said spindle, regardless of which spindle is employed.

2. A mechanism in accordance with claim 1 wherein said bore means is comprised of a machine connecting end and a tool connecting end and the annular groove is located at the end of said threaded section located nearest the machine connecting end of said bore means.

3. A mechanism in accordance with claim 2 which further includes a conical shaft having a face portion provided with an encoder ring and said annular groove is located nearest said machine connecting end.

4. A mechanism in accordance with claim 1 which further includes an encoder ring and a snap lock means for removably securing said encoder ring against rotation to said toolholder, said toolholder having a face portion and said encoder ring being located at said face portion.

5. A mechanism in accordance with claim 4 wherein said toolholder is comprised of a conical shaft having a tubular end, said snap lock means comprising a peripheral rib provided on said tubular end having a flatly curved cross-sectional shape and a sleeve section provided with a recessed end for engaging the peripheral rib.

6. A mechanism in accordance with claim 5 wherein said toolholder further includes a shoulder and said sleeve section includes a face portion which coacts with said shoulder.

7. A mechanism in accordance with claim 6 wherein said toolholder further includes an axially projecting pin and said sleeve section includes a face portion having a recess alignable with said pin.

8. A mechanism in accordance with claim 5 wherein said toolholder further includes a shoulder and said sleeve section is provided at, at least, two opposite points with peripheral bevel means for permitting the application of a fork-shaped spanner for removing said encoder ring, acting on the one hand against shoulder faces of the encoder ring formed by said bevels and on the other hand against the shoulder of said toolholder.

* * * * *